United States Patent
Andersen et al.

(10) Patent No.: US 11,157,322 B2
(45) Date of Patent: Oct. 26, 2021

(54) HYPER-CONVERGED INFRASTRUCTURE (HCI) EPHEMERAL WORKLOAD/DATA PROVISIONING SYSTEM

(71) Applicant: Dell Products L.P., Round Rock, TX (US)

(72) Inventors: Ryan Joseph Andersen, Belmont, MA (US); Jian Liu, Lexington, MA (US)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 16/173,757

(22) Filed: Oct. 29, 2018

(65) Prior Publication Data
US 2020/0133733 A1   Apr. 30, 2020

(51) Int. Cl.
*G06F 9/50* (2006.01)
*G06F 16/27* (2019.01)

(52) U.S. Cl.
CPC ............ *G06F 9/5033* (2013.01); *G06F 9/505* (2013.01); *G06F 16/27* (2019.01); *G06F 2209/505* (2013.01)

(58) Field of Classification Search
None
See application file for complete search history.

(56) References Cited

U.S. PATENT DOCUMENTS

| 2018/0026913 A1* | 1/2018 | Balle | G02B 6/4292 709/226 |
| 2018/0276050 A1* | 9/2018 | Gong | G06F 9/5083 |
| 2019/0310894 A1* | 10/2019 | Aronovich | G06F 9/5083 |

* cited by examiner

*Primary Examiner* — Lewis A Bullock, Jr.
*Assistant Examiner* — Melissa A Headly
(74) *Attorney, Agent, or Firm* — Joseph Mencher

(57) ABSTRACT

A Hyper-Converged Infrastructure (HCI) ephemeral workload/data provisioning system includes a workload system coupled to a plurality of HCI systems by a manager system. The manager system identifies a first ephemeral workload that is provided by the workload system and that is configured to operate on one of the plurality of HCI systems for less than a first time period. In response to identifying the first ephemeral workload, the manager system determines first data that is to-be utilized by the first ephemeral workload and that is stored on a first HCI system that is included in the plurality of HCI systems. In response to determining that the first HCI system includes the first data that is to-be utilized by the first ephemeral workload, the manager system causes the first ephemeral workload to be provisioned on the first HCI system.

17 Claims, 8 Drawing Sheets

HYPER-CONVERGED INFRASTRUCTURE (HCI) EPHEMERAL WORKLOAD/DATA PROVISIONING SYSTEM

BACKGROUND

The present disclosure relates generally to information handling systems, and more particularly to provisioning ephemeral workloads and data in a Hyper-Converged Infrastructure (HCI) provided by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are sometimes utilized to provide Hyper-Converged Infrastructure (HCI) systems. HCI systems provide a software-defined Information Technology (IT) infrastructure that virtualizes the elements of conventional hardware-defined systems, including virtualized computing (e.g., via a hypervisor), virtualized storage (e.g., via a software-defined Storage Area Network (SAN)), virtualized networking (e.g., via software-defined networking), and/or other HCI components known in the art. HCI systems may be provided in HCI clusters (i.e., that include a plurality of HCI systems) that allow for the provisioning of data and workloads that utilize that data across the HCI cluster. In conventional systems, workloads are provisioned on HCI systems in an HCI cluster based on Service Level Agreements (SLAs) for those workloads, HCI system throughput, and/or other HCI system characteristics known in the art. With a first workload provisioned on a first HCI system in the HCI cluster, data stored on other HCI systems in the HCI cluster is typically replicated on the first HCI system if that first workload utilizes that data. However, the provisioning of data and workloads across the HCI cluster in such a manner can raise a number of issues.

For example, some workloads are ephemeral in that those workloads operate (i.e., utilize processing cycles) on HCI systems for a relatively short amount of time (e.g., on the order of seconds, minutes, hours, etc.), as compared to non-ephemeral workloads that operate on HCI systems for a relatively long amount of time (e.g., on the order of days, weeks, months, etc.) It has been discovered by the inventors of the present disclosure that performing the conventional data replication discussed above to place data on the HCI system that includes such ephemeral workloads can have a material impact on the overall workload processing time. For example, if such ephemeral workloads process static data located on a particular HCI system, the HCI data access and replication network may be weighed down with replication requests as the workloads wait for the data to be replicated on their respective HCI systems that they have been provisioned on. As the number of ephemeral workloads provided in an HCI cluster increases, the overall system performance decreases exponentially with the number of HCI systems in the HCI cluster.

Accordingly, it would be desirable to provide an improved ephemeral workload/data provisioning system for HCI clusters.

SUMMARY

According to one embodiment, an Information Handling System (IHS) includes a processing system; and a memory system that is coupled to the processing system and that includes instructions that, when executed by the processing system, cause the processing system to provide a manager engine that is configured to: identify a first ephemeral workload that is configured to operate on one of a plurality of Hyper-Converged Infrastructure (HCI) systems for less than a first time period; determine, in response to identifying the first ephemeral workload, first data that is to-be utilized by the first ephemeral workload and that is stored on a first HCI system that is included in the plurality of HCI systems; and cause, in response to determining that the first HCI system includes the first data that is to-be utilized by the first ephemeral workload, the first ephemeral workload to be provisioned on the first HCI system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
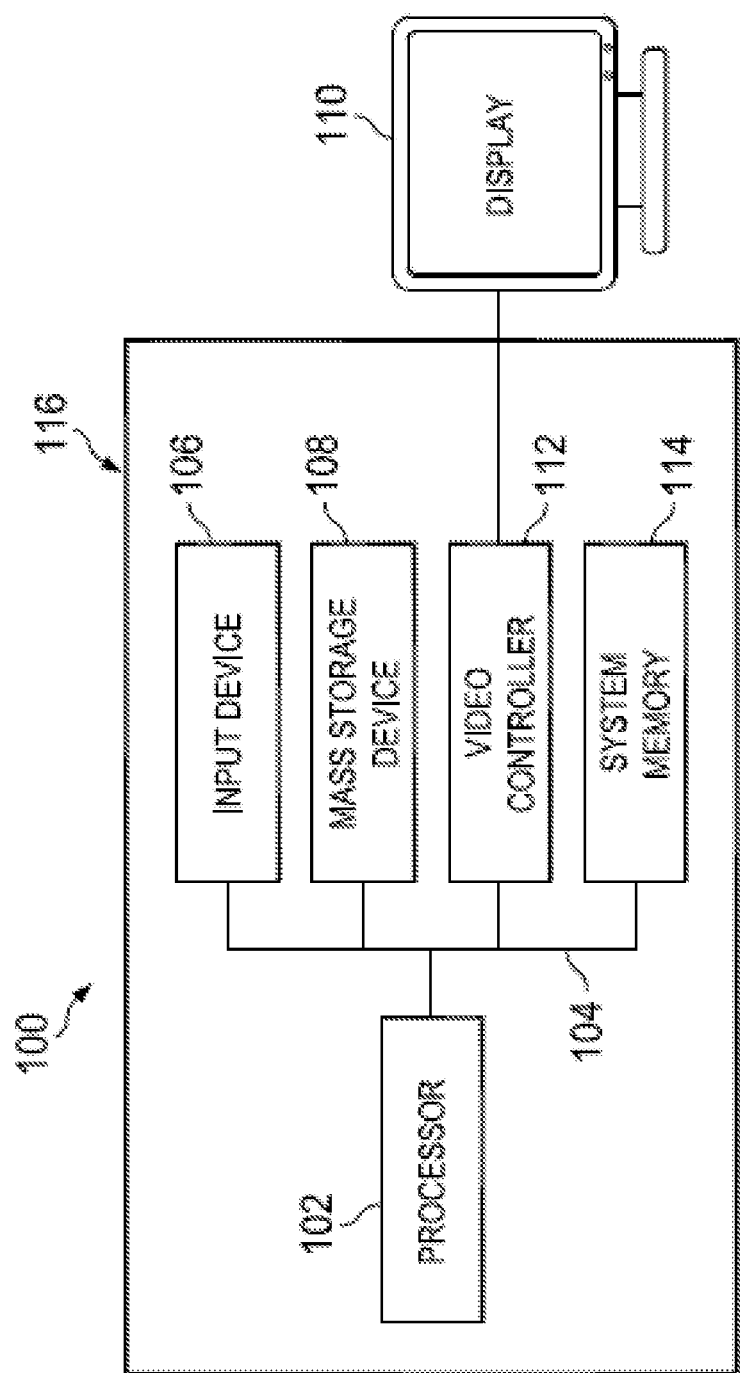
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
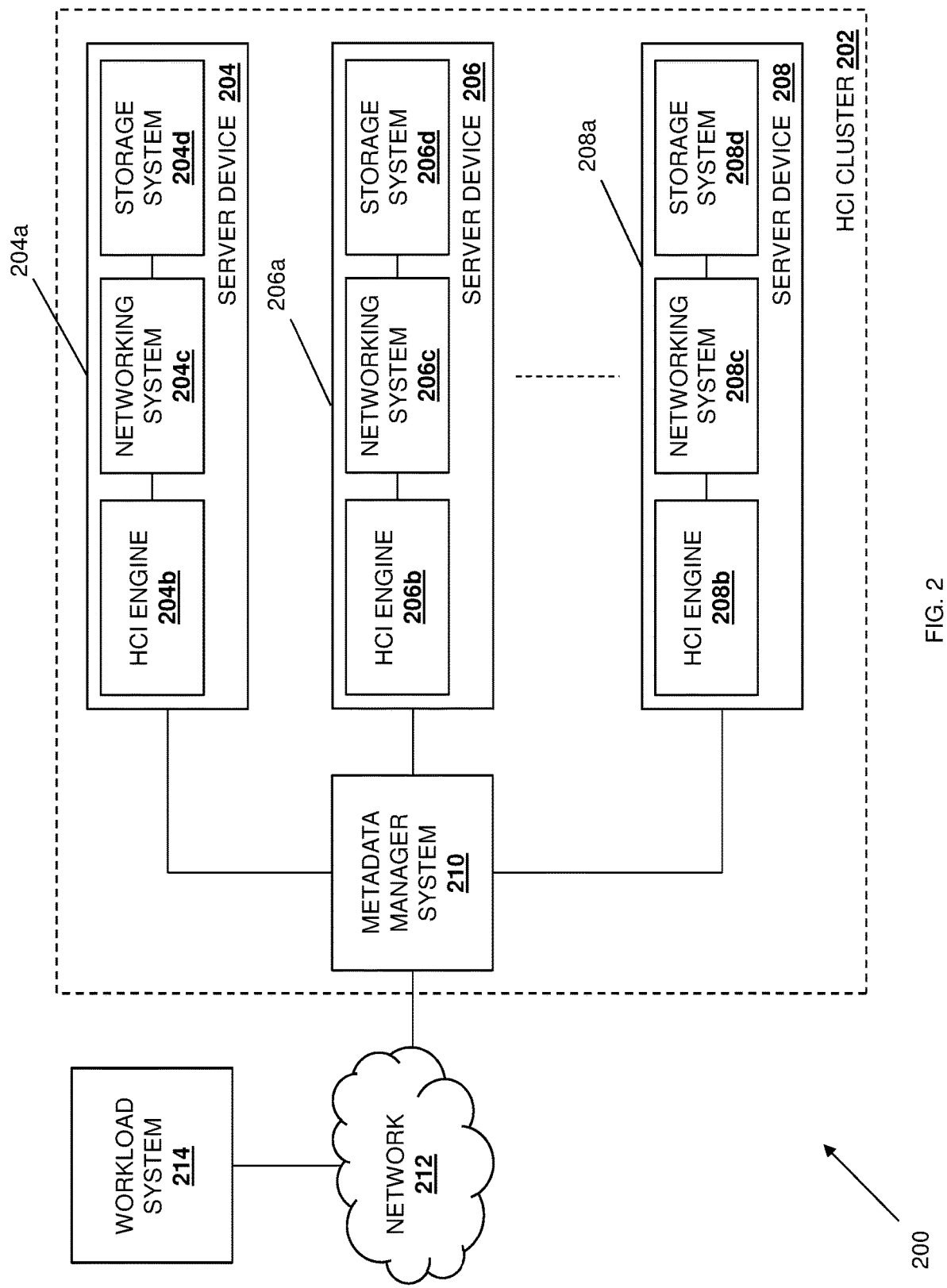
FIG. 2 is a schematic view illustrating an embodiment of a network including a Hyper-Converged Infrastructure (HCI) cluster that operates according to the teachings of the present disclosure.

Referring now to FIG. 2, an embodiment of a network 200 is illustrated that operates according to the teachings of the present disclosure. In the illustrated embodiment, the network 200 includes a Hyper-Converged Infrastructure (HCI) cluster 202 having a plurality of HCI systems that are provided by the server devices 204, 206, and up to 208 in the examples below. In many embodiments, any or all of the server devices 204-208 may be provided by the IHS 100 discussed above with reference to FIG. 1, and/or may include some or all of the components of the IHS 100. As discussed above, the server devices 204-208 of the present disclosure are utilized to provide HCI systems that each include a software-defined Information Technology (IT) infrastructure that virtualizes the elements of conventional hardware-defined systems, including virtualized computing (e.g., via a hypervisor), virtualized storage (e.g., via a software-defined Storage Area Network (SAN)), virtualized networking (e.g., via software-defined networking), and/or other HCI components known in the art. The provisioning of the HCI systems provided by the server devices 204-208 in the HCI cluster 202 allows for the provisioning of data and workloads that utilize that data across the HCI cluster 202. However, while illustrated and described as being provided by server devices, HCI systems may be provided by a variety of computing devices while remaining within the scope of the present disclosure as well. Furthermore, while a single HCI cluster 202 is illustrated and described below, networks that include multiple HCI clusters similar to the HCI cluster 202 will fall within the scope of the present disclosure as well.

In the illustrated embodiment, the server device 204 includes a chassis 204a that houses the components of the server device 204, only some of which are illustrated in FIG. 2. For example, the chassis 204a may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 204b that is configured to perform the functions of the HCI engines and server devices discussed below. The chassis 204a may also house a networking system 204c that is coupled to the HCI engine 204b (e.g., via a coupling between the networking system 204c and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 204a may also house a storage system 204d that is coupled to the HCI engine 204b (e.g., via a coupling between the storage system 204d and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In a particular example, the HCI engine 204b may be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 204d), virtualized networking (e.g., via software-defined networking using the networking system 204c), and/or other HCI components known in the art. While a specific server device 204 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure.

Similarly, the server device 206 includes a chassis 206a that houses the components of the server device 206, only some of which are illustrated in FIG. 2. For example, the chassis 206a may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 206b that is configured to perform the functions of the HCI engines and server devices discussed below. The chassis 206a may also house a networking system 206c that is coupled to the HCI engine 206b (e.g., via a coupling between the networking system 206c and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 206a may also house a storage system 206d that is coupled to the HCI engine 206b (e.g., via a coupling between the storage system 206d and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In a particular example, the HCI engine 206b may be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 206d), virtualized networking (e.g., via software-defined networking using the networking system 206c), and/or other HCI components known in the art. While a specific server device 206 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure.

Similarly, the server device 208 includes a chassis 208a that houses the components of the server device 208, only some of which are illustrated in FIG. 2. For example, the chassis 208a may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 208b that is configured to perform the functions of the HCI engines and server devices discussed below. The chassis 208a may also house a networking system 208c that is coupled to the HCI engine 208b (e.g., via a coupling between the networking system 208c and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 208a may also house a storage system 208d that is coupled to the HCI engine 208b (e.g., via a coupling between the storage system 208d and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In a particular example, the HCI engine 208b may be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 208d), virtualized networking (e.g., via software-defined networking using the networking system 208c), and/or other HCI components known in the art. While a specific server device 208 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure In the illustrated embodiment, the HCI cluster 202 also includes a metadata manager system 210 that is coupled to each of the HCI systems provided by the respective server devices 204-208. In some examples, the metadata manager system 210 may be provided by one or more server devices (separate from the server devices 204-208) that include a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide a metadata manager engine that is configured to perform the functions of the metadata manager engines and metadata manager systems discussed below. In many embodiments, a server device that provides the metadata manager system 210 may be provided by the IHS 100 discussed above with reference to FIG. 1, and/or may include some or all of the components of the IHS 100.

However, in other examples, the metadata manager system 210 may be provided by one or more of the server devices 204-208 that also provide the HCI systems in the HCI cluster 202 (e.g., the server devices 204, 206, and/or 208 may include a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide a metadata manager engine that is configured to perform the functions of the metadata manager engines and metadata manager systems discussed below). In a specific example, redundant instances of the metadata manager system 210 are provided on two or more of the server devices 204, 206, and up to 208 (e.g., a primary metadata manager engine may be provided on the server device 204 and configured to perform any of the functionality of the metadata manager engines/metadata manager systems discussed below, while a redundant metadata manager engine may be provided on the server device 206 and configured to perform any of the functionality of the metadata manager engines/metadata manager systems discussed below in the event the primary metadata manager engine becomes unavailable due to, for example, an unavailability of the server device 204.) However, while specific examples of the provisioning of the metadata manager system 210 in the HCI cluster 202 have been illustrated and described, one of skill in the art in possession of the present disclosure will recognize that the functionality of the metadata manager system 210 described herein may be provided by a variety of devices and/or components in the network 200 while remaining within the scope of the present disclosure as well.

In the illustrated embodiment, the metadata manager system 210 is coupled to a network 212 that may be provided by a Local Area Network (LAN), the Internet, and/or a variety of other networks that would be apparent to one of skill in the art in possession of the present disclosure. Furthermore, a workload system 214 is coupled to the network 212, and may be provided by one or more server devices, storage devices, and/or other components that are configured to store workloads and provide those workloads to the metadata manager system 210 for provisioning on the HCI cluster 202 as described below. In many embodiments, the server device(s), storage device(s), and/or other components that provide the workload system 214 may be provided by the IHS 100 discussed above with reference to FIG. 1, and/or may include some or all of the components of the IHS 100. While a specific network 200 implementing the HCI ephemeral workload/data provisioning system of the present disclosure has been illustrated and described, one of skill in the art in possession of the present disclosure will recognize that HCI ephemeral workload/data provisioning systems according to the teachings of the present disclosure may include a variety of different components and/or component configurations while remaining within the scope of the present disclosure as well.

Figure 3:
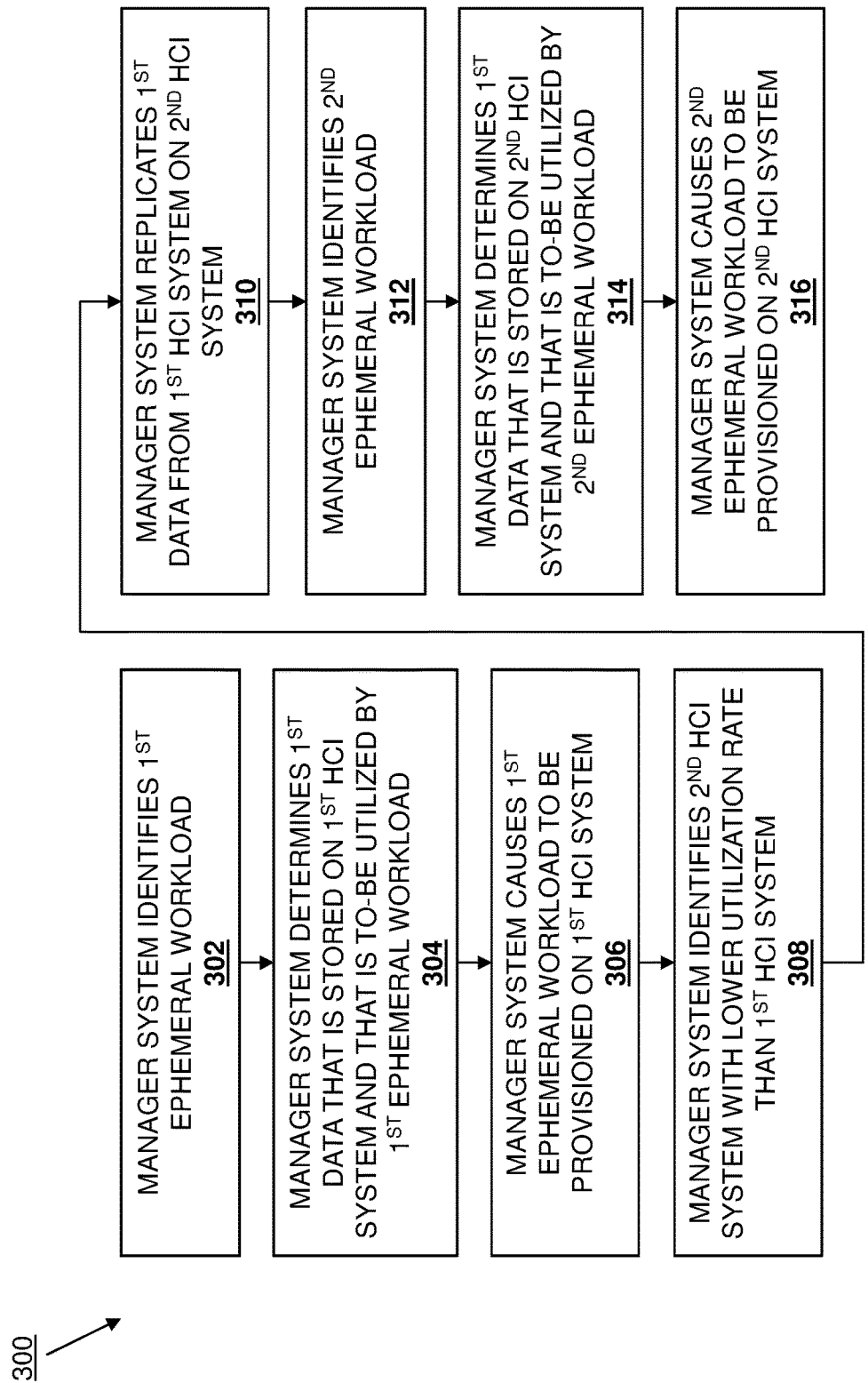
FIG. 3 is a flow chart illustrating an embodiment of a method for provisioning ephemeral workloads/data in an HCI cluster.

Referring now to FIG. 3, an embodiment of a method 300 for provisioning ephemeral workloads/data in HCI clusters is illustrated. As discussed below, the systems and methods of the present disclosure provide for an increase in the overall performance of HCI clusters while improving workload processing times for workloads performed via HCI systems in those HCI clusters. This is achieved, at least in part, by the identification of ephemeral, or relatively short-lived, workloads prior to deploying or otherwise provisioning those ephemeral workloads on an HCI system an HCI cluster. When any ephemeral workloads will be utilizing data that is already stored in an HCI system in the HCI cluster, that ephemeral workload may be deployed or otherwise provisioned on that HCI system where that data is stored, which eliminates the need to replicate that data on a different HCI system upon which the workload would otherwise be deployed/provisioned in a conventional system. As such, the time necessary to replicate data in the HCI cluster is eliminated, thus eliminating a material component of the workload processing time for ephemeral workloads. Furthermore, when data on a first HCI system in the HCI cluster is regularly accessed by ephemeral workloads, the systems and methods of the present disclosure may preemptively replicate that data on a second HCI system in the HCI cluster that may have a lower utilization rate relative to the first HCI system, which allows subsequent ephemeral workloads to be deployed or otherwise provisioned on HCI systems with relatively low utilization rates (rather than continually deploying or otherwise provisioning those ephemeral workloads on an HCI system that may have a relatively high utilization rate.)

The method 300 begins at block 302 where a manager system identifies a first ephemeral workload. In an embodiment, at block 302, the metadata manager system 210 in the HCI cluster 202 may identify a first ephemeral workload. As discussed above, some workloads deployed in HCI clusters are ephemeral in that those workloads operate on HCI systems for a relatively short amount of time as compared to non-ephemeral workloads that operate on HCI systems for a relatively long amount of time. For example, ephemeral workloads are often analytical in nature, and directed to relatively quick processing tasks that have a relatively short time-to-live. The amount of time an ephemeral workload requires for processing according to the teaching of the present disclosure will vary, and in many embodiments a workload that requires a particular time period to process may be defined as ephemeral relative to a time period required to process a non-ephemeral workload provided in the HCI cluster.

For example, many ephemeral workloads according to the teachings of the present disclosure will require processing for time periods on the order of seconds (e.g., 2-5 seconds), as compared to many non-ephemeral workloads according to the teachings of the present disclosure that require processing for time periods of months (e.g., 2 or more months). However, one of skill in the art will recognize that a workload may be defined as ephemeral while falling within the scope of the present disclosure when that ephemeral workload requires a processing time period on the order of seconds when non-ephemeral workloads require a processing time period of days; when that ephemeral workload requires a processing time period on the order of minutes when non-ephemeral workloads require a processing time period of weeks; when that ephemeral workload requires a processing time period on the order of hours when non-ephemeral workloads require a processing time period of months; as well as any other ephemeral/non-ephemeral time-period-difference in which the functionality of the present disclosure will provide the HCI-cluster-performance and workload-processing-time enhancements described herein. In the discussions below, the amount of time required to process an ephemeral workload is referred to as an "ephemeral time period", and may be determined based on any or all of the considerations detailed above.

In embodiments of block 302, workloads may be stored in the workload system 214 and provided through the network 212 to the metadata manager system 210 for provisioning in the HCI cluster 202. In some examples, workloads provided by the workload system 214 to the metadata manager system 210 for provisioning on the HCI cluster 202 may include a workload tag that that indicates that the workload is an ephemeral workload that is configured to operate on an HCI system for less than a workload time period. In a specific example, the workload tag may include a time-to-live indicator, which may be provided in an application that is part of the workload by, for example, an author of that application, by the workload system 214, and/or by any other entity or device that is configured to estimate or determine an amount of time required to process the workload. As such, at block 302, the metadata manager system 310 may receive a workload for provisioning in the HCI cluster 2021 from the workload system 214 via the network 212, access the workload tag/time-to-live indicator and determine that the workload tag/time-to-live indicator indicates that that workload will operate on an HCI system for less than the workload time period, determine that the workload time period is less than the ephemeral time period discussed above and, in response, identify that the workload is an ephemeral workload (also referred to as a "first ephemeral workload" in comparison to the "second ephemeral workload" referenced in the method 300 below). In some embodiments, the time-to-live of a workload may also depend on the HCI system upon which it is to be provisioned (e.g., how "busy" that HCI system is, how "full" that HCI system is, etc), and a administrator or other user may define when a time-to-live of a workload qualifies that workload as an ephemeral workload.

The method 300 then proceeds to block 304 where the manager system determines first data that is stored on a first HCI system and that is to-be utilized by the first ephemeral workload. In an embodiment, at block 304, the metadata manager system 210 may operate to determine data that is to-be utilized by the first ephemeral workload received at block 302 of the method 300 (also referred to as "first data" below). For example, the first ephemeral workload may include a table or other data structure that identifies the first data the first ephemeral workload will utilize during its processing, and at block 304, the metadata manager system 210 may determine the first data that is to-be utilized by the first ephemeral workload by accessing that table or data structure (which may include file(s) that include workload definitions, workload deployment specifications, and/or other information that identifies the data stores required by the workloads, the time-to-live for the workload applications, etc.). Furthermore, in other examples, the metadata manager system 210 may determine the first data that is to-be utilized by the first ephemeral workload by accessing information that has been provided by an administrator or other user of the HCI cluster 202 and that specifies the data store to be utilized/processed by the ephemeral workload (e.g., based on knowledge of both the workload and the data stores in the system), and/or via other techniques that would be apparent to one of skill in the art in possession of the present disclosure.

Figure 4A:
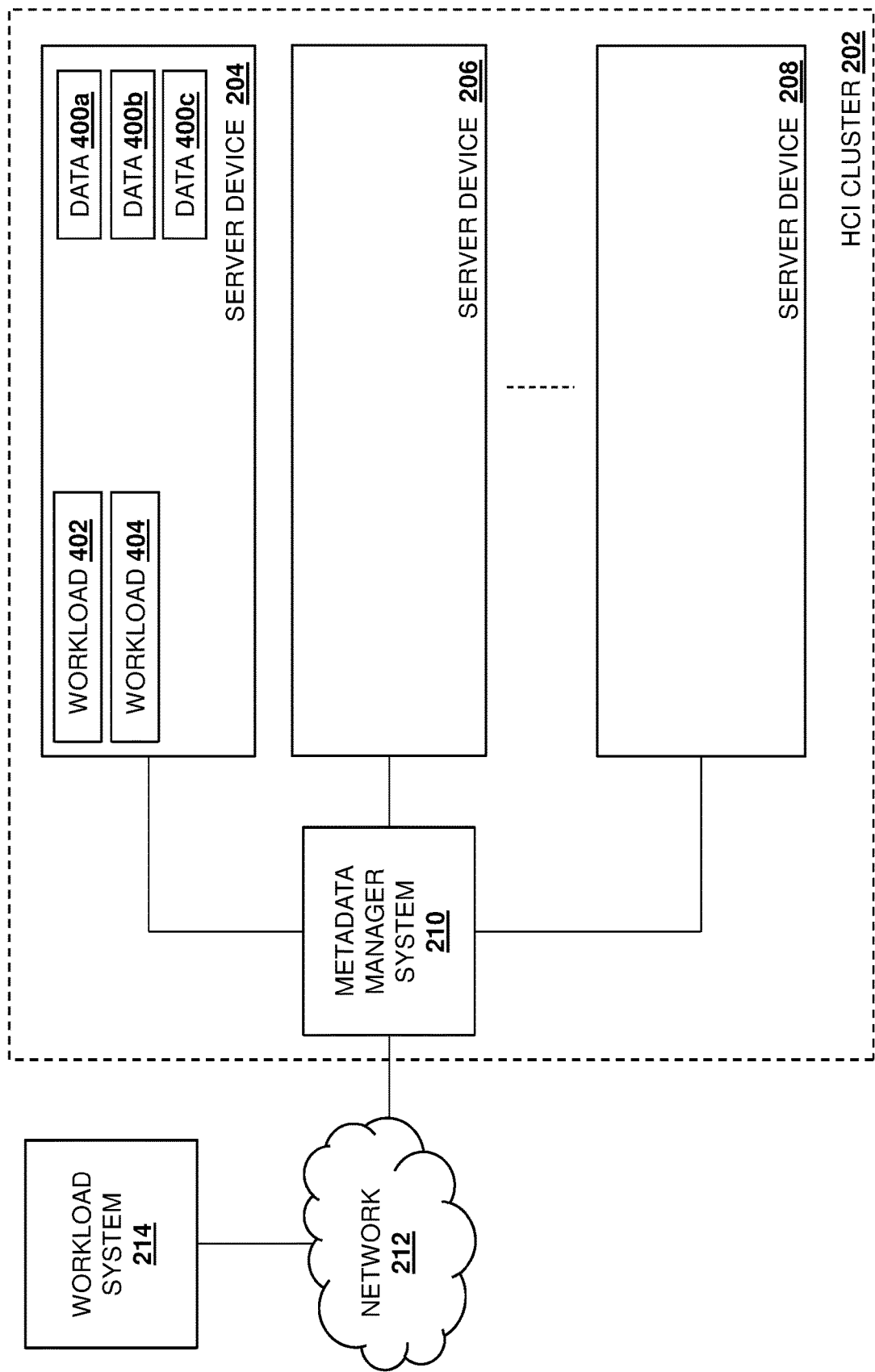
FIG. 4A is a schematic view illustrating an embodiment of existing workloads and data in the HCI cluster of FIG. 2.

Following the determination of the first data that will be utilized by the first ephemeral workload, the metadata manager system 210 may then determine an HCI system in the HCI cluster 202 that stores that first data. For example, with reference to FIG. 4A, the server device 204 is illustrated as providing an HCI system (referred to as a "first HCI system" below) that stores data store(s) that include data 400a, data 400b, and data 400c. Furthermore, in the embodiment illustrated in FIG. 4A, the server device 204 that provides the first HCI system has been previously provided with a workload 402 and a workload 404 which, in the example below, are non-ephemeral workloads. As such, prior to the method 400, the workloads 402 and 404 may be provided on the first HCI system provided by the server device 204 (e.g., processed by the resources included in the server device 204), and may operate to access any or all of the data 400a, 400b, and 400c. At block 304, the metadata manager system 210 may then determine that the data 400c that is stored in the first HCI system provided by the server device 204 corresponds to the first data that will be utilized by the first ephemeral workload identified at block 302.

Figure 4B:
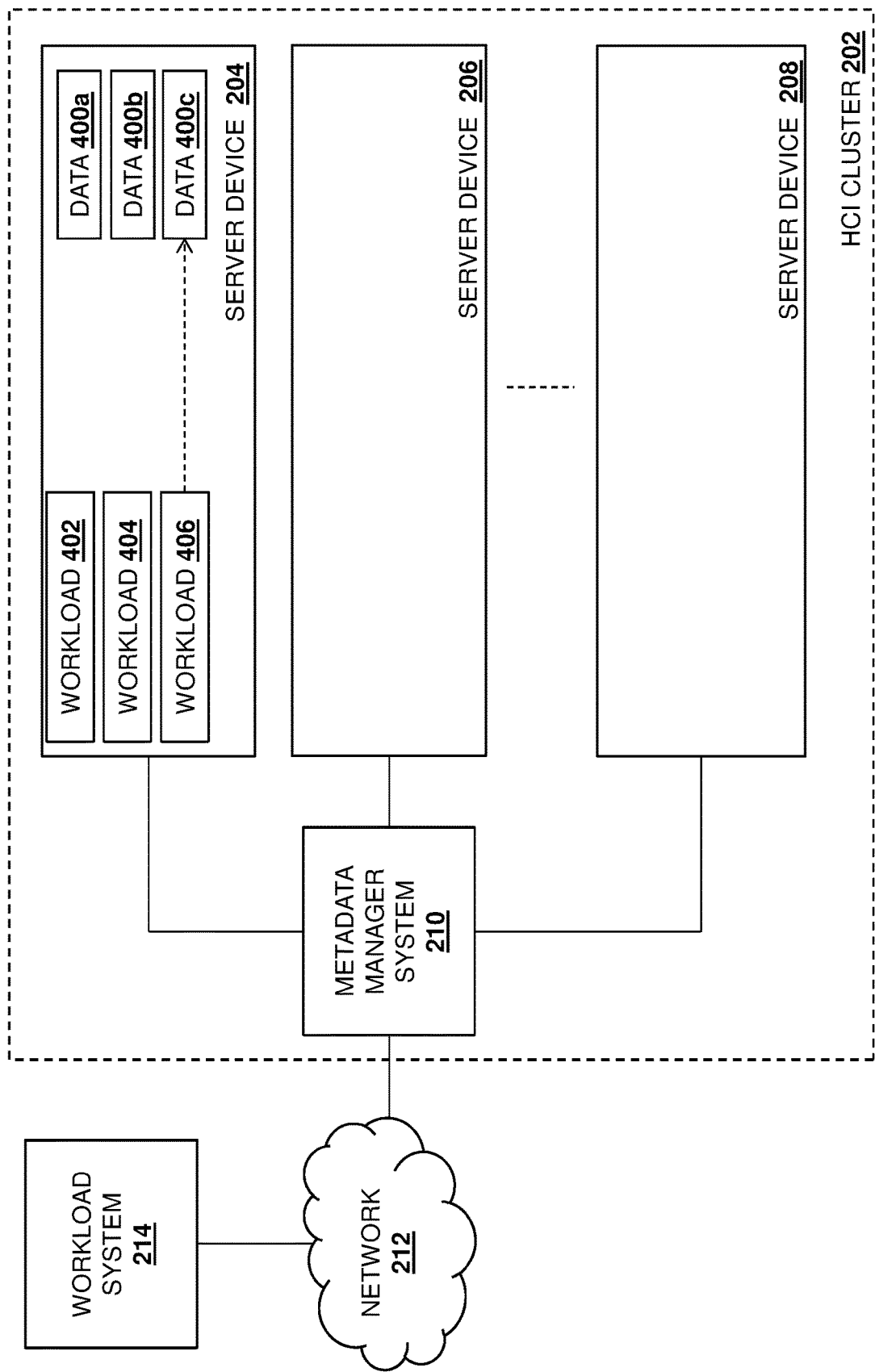
FIG. 4B is a schematic view illustrating an embodiment of an ephemeral workload provisioned in the HCI cluster of FIG. 4A.

The method 300 then proceeds to block 306 where the manager system causes the first ephemeral workload to be provisioned on the first HCI system. In an embodiment, at block 306, the metadata manager system 210 may operate to provision the first ephemeral workload identified at block 302 on the first HCI system provided by the server device 204. For example, with reference to FIG. 4B, at block 306 the metadata manager system 210 may install, substantiate, and/or otherwise provide any application(s), instructions, and/or code that make up the first ephemeral workload (illustrated as the workload 406 in FIG. 4B) on the server device 204 such that the first HCI system provided by the server device 204 is configured to process that first ephemeral workload 406, which one of skill in the art in possession of the present disclosure will recognize includes accessing the first data/data 400c discussed above (as indicated by the dashed arrow in FIG. 4B).

In some examples, prior to the provision of the first ephemeral workload 406 on the first HCI system/server device 204, the first HCI system/server device 204 may have a relatively high utilization rate (e.g., a relatively high utilization rate of the HCI engine 204b, the processing system that provides the HCI engine 204b, the memory system that provides the HCI engine 204b, the networking system 204c that provides the first HCI system, the storage system that provides the first HCI system, etc.) as compared to the server devices 206 and up to 208. However, it has been discovered that the provisioning of ephemeral workloads (e.g., the first ephemeral workload 406) on HCI systems (e.g., the first HCI system provided by the server device 204) that include the data utilized by those ephemeral workloads (e.g., the first data 400c) and that have relatively high utilization rates (e.g., due to their processing of non-ephemeral workloads like the workloads 402 and 404) provides for a relatively faster/shorter workload processing time due to the relatively short amount of time needed to process those ephemeral workloads, as compared to provisioning the ephemeral workloads on an HCI system/server device that does not include the data utilized by those ephemeral workloads, and then replicating that data to the HCI system/ server device upon which those ephemeral workloads were provisioned.

Figure 4C:
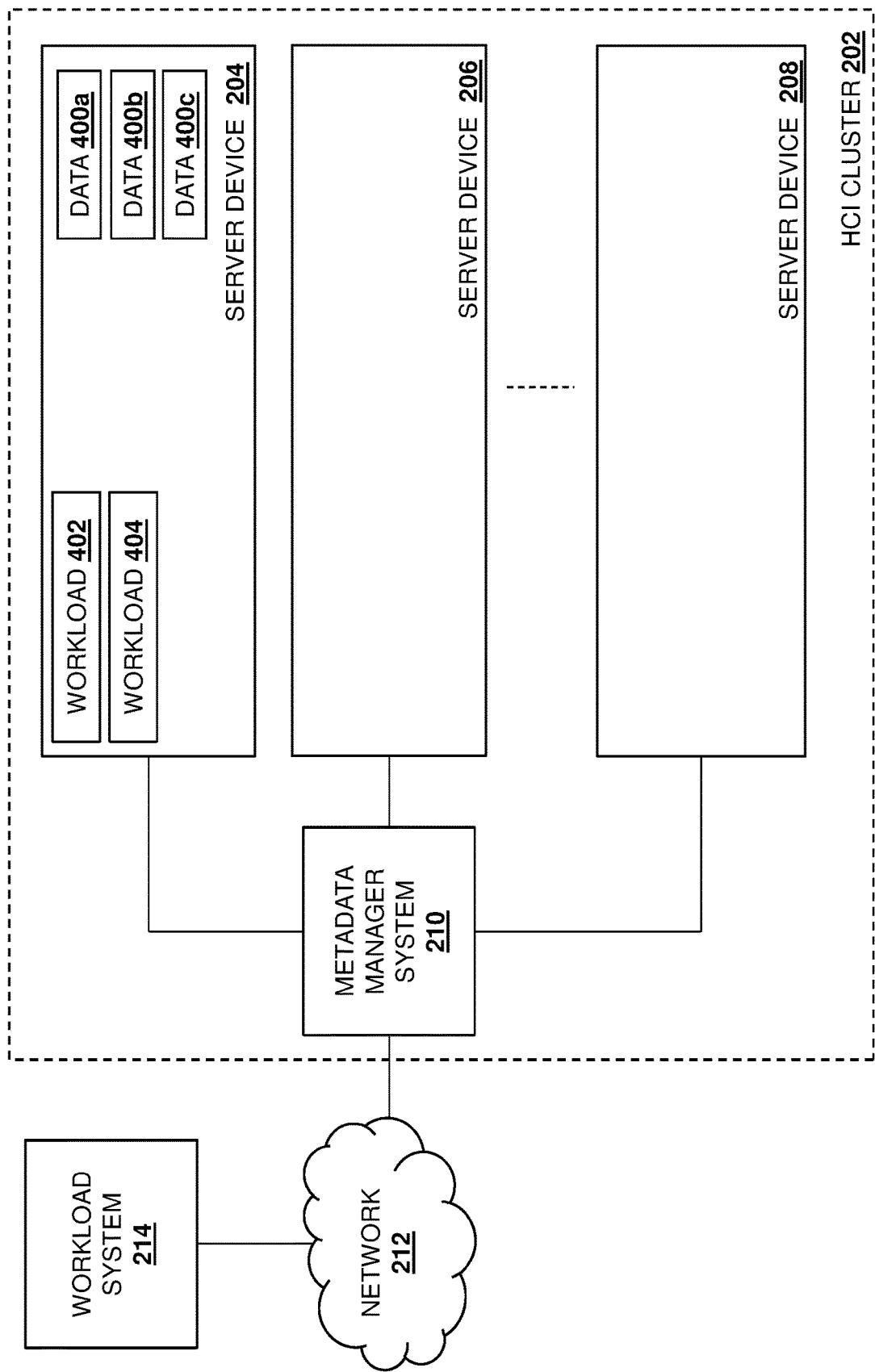
FIG. 4C is a schematic view illustrating an embodiment of the ephemeral workload that was provisioned in the HCI cluster in FIG. 4B removed from the HCI cluster.

As such, the metadata manager system 210 is configured to provision any ephemeral workload received from the workload system 214 on the HCI system/server device in the HCI cluster 202 that also stores the data that is to be utilized by that ephemeral workload, as the relatively short amount of time needed to process those ephemeral workloads provides faster workload processing times relative to conventional techniques that provision the workload on a lower-utilized HCI system/server device, and then replicate the data that is used by those workloads (and which is stored on other HCI systems/server devices in the HCI cluster) on that lower-utilized HCI system/server device. With reference to FIG. 4C, following the processing of the first ephemeral workload 406, the first ephemeral workload 406 may be removed from the first HCI system/server device 204 by, for example, deleting, removing, or otherwise causing the application(s), instructions, and/or code that make up the first ephemeral workload to no longer use the resources of the first HCI system/server device 204.

The method 300 may then proceed to block 308 where the manager system identifies a second HCI system with a lower utilization rate than the first HCI system. In some embodiments, at block 308, the metadata manager system 210 may operate to identify HCI system(s) in the HCI cluster 202 that have a lower utilization rate than the first HCI system/server device 204 upon which the first ephemeral workload was provisioned at block 306. For example, at block 308 the metadata manager system 210 monitor the utilization of resources in each of the server devices 206 and up to 208 that are used to provide their respective HCI systems (e.g., a utilization rate of the HCI engine, the processing system that provides the HCI engine, the memory system that provides the HCI engine, the networking system that provides the HCI system, the storage system that provides the HCI system, etc), and compare those utilizations with the utilization of the resources in the server device 204 that are used to provide the first HCI system (e.g., a utilization rate of the HCI engine 204b, the processing system that provides the HCI engine 204b, the memory system that provides the HCI engine 204b, the networking system 204c that provides the first HCI system, the storage system 204d that provides the first HCI system, etc.) In the examples provided below, at block 308 the metadata manager system 210 determines that the utilization of the resources in the server device 206 that provides a "second HCI system" are lower than the utilization of resources in the server device 204 that provides the first HCI system.

Figure 4D:
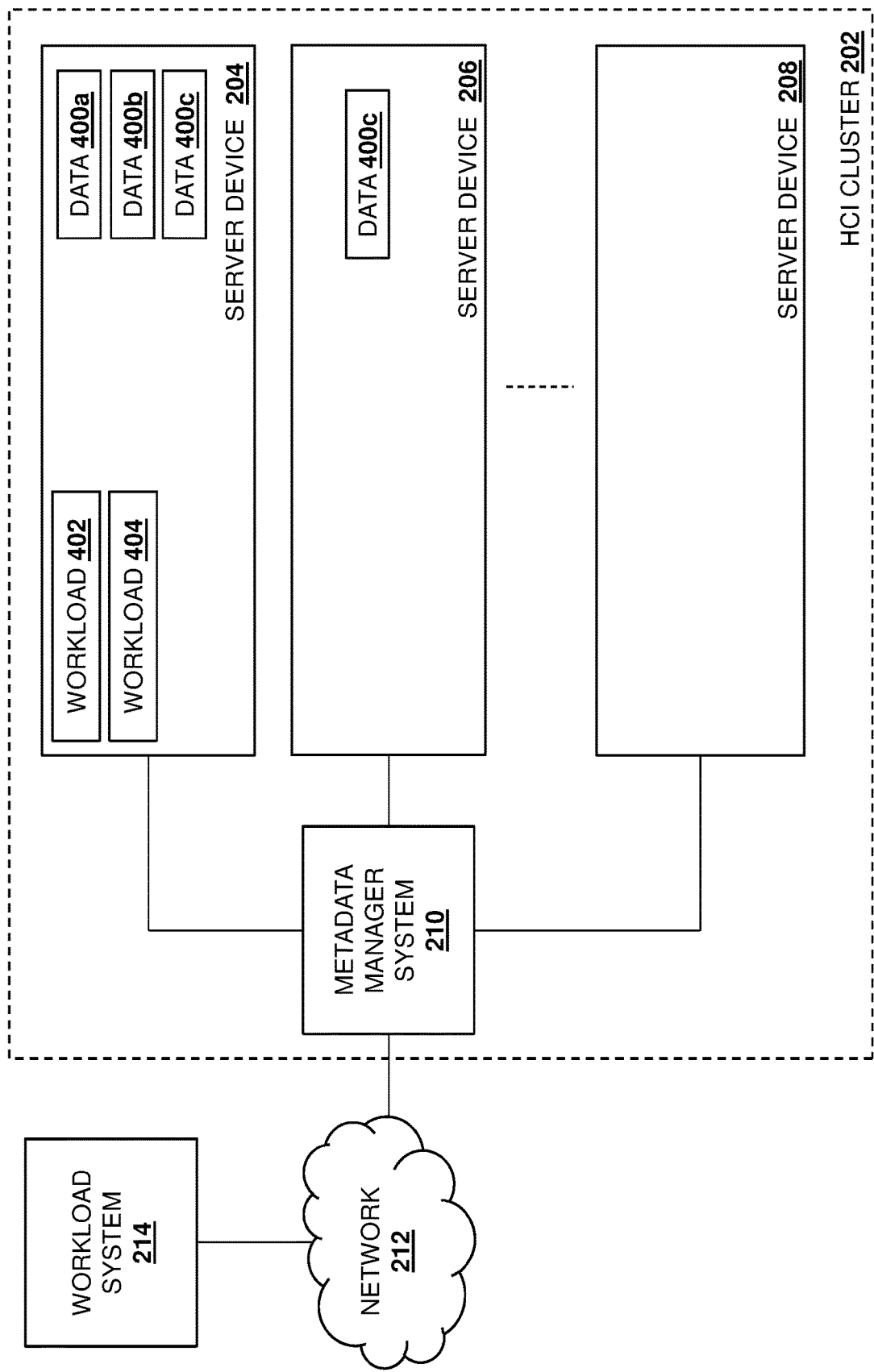
FIG. 4D is a schematic view illustrating an embodiment of data replicated in the HCI cluster of FIG. 4A.

The method 300 then proceeds to block 310 where the manager system replicates the first data from the first HCI system on the second HCI system. In an embodiment, at block 310, the metadata manager system 210 may operate to replicate the first data 400c that is included on the first HCI system provided by the server device 204 to the second HCI system provided on the server device 206 based on the determination that the second HCI system provided on the server device 206 has a lower utilization that the first HCI system provided on the server device 204 (e.g., the determination that the second HCI system/server device 206 has more available processing cycles than the first HCI system/server device 204). As discussed above, in some embodiments the first HCI system/server device 204 may have a relatively high utilization rate as compared to the second HCI system/server device 206 (e.g., due to its processing of the workloads 402 and 404), and thus the provisioning of the first ephemeral workload 206 on the server device 204 may have required an interruption in the processing of the non-ephemeral workloads 402 and 404. In some examples (particularly in consideration of the possibility that the first data 400c may be again accessed by ephemeral workloads in the future), the metadata manager device 210 may operate at block 310 to replicate the first data 400c on the second HCI system/server device 206 that has the lower utilization rate than the first HCI system/server device 206, as illustrated in FIG. 4D. As would be understood by one of skill in the art in possession of the present disclosure, the replication of the first data 400c may be performed at block 310 when the metadata manager system 210 does not currently have any ephemeral workloads that are to-be provisioned on the HCI cluster 202 and that will utilize the first data 400c, and/or while the second HCI system/server device does not include any workloads (ephemeral and/or non-ephemeral) that will utilize the first data 400c.

While blocks 308 and 310 are described according to the method 300 as identifying a second HCI system that has a lower utilization rate than a first HCI system that previously had a first ephemeral workload provisioned on it, the functionality described above for blocks 308 and 310 may be performed at any time for any HCI systems/server devices in the HCI cluster. For example, any HCI system/server device storing data that is utilized by ephemeral workloads (and particularly data that is repeatedly utilized by ephemeral workloads) may have its utilization compared to other HCI systems/server devices in the HCI cluster to determine whether data should be moved to a lower utilized HCI system/server device that is more capable of handling ephemeral workloads (e.g., as compared to an HCI system/server device that is currently handling non-ephemeral workloads and must have that handling interrupted to handle ephemeral workloads.)

In some embodiments, data stores and/or data that is stored on an HCI system/server device may include a data tag that indicates that that data is likely to be utilized by an ephemeral workload. For example, an HCI system/server device writing data to its storage system/virtual SAN may identify that that data may be repeatedly utilized by ephemeral workloads via, for example, workload utilization information specified by an administrator or other user at the time the data store is created, workload utilization information specified by the administrator or other user after the data store is created, and/or a variety of other ephemeral workload data indicators that would be apparent to one of skill in the art in possession of the present disclosure. Such workload utilization designations may be based on observations by the administrator or other user, the fact that a subsequent workload that is designated as ephemeral is accessing/requesting access to the data store, and/or other automated workload/data store profiling information that is configured to discover ephemeral workload data store usage patterns. Upon identification of data in an HCI system/server device that includes the data tag that indicates that data is likely to be utilized by ephemeral workloads, the metadata manager system 210 may preemptively replicate those data stores and/or that data to relatively lower utilized HCI systems/server devices in the HCI cluster, despite there being no workloads on those lower utilized HCI systems/server devices that will currently be using that data, and despite the metadata manager not currently having any workloads for provisioning on the HCI cluster that are to utilize that data. Furthermore, in some examples, the metadata manager system 210 may selectively replicate higher utilized sections of data stores/data for increased efficiency. As such, with reference to the discussion of the method 300 above, prior to block 302 and with reference to the situation illustrated in FIG. 4A, the first data 400c may have been replicated to the first HCI system/server device 204 from first data that is located on a different HCI system/server device that has a higher utilization rate then the first HCI system/server device 204.

The method 300 then proceeds to block 312 where the manager system identifies a second ephemeral workload. Similarly as discussed above at block 302 for the first ephemeral workload, in embodiments of block 312, workloads stored in the workload system 214 may be provided through the network 212 to the metadata manager system 210 for provisioning in the HCI cluster 202, and those workloads may include a workload tag that that indicates that the workload is an ephemeral workload that is configured to operate on an HCI system for less than the workload time period (e.g., the time-to-live indicator discussed above). As such, at block 302, the metadata manager system 310 may receive a workload for provisioning in the HCI cluster 202 from the workload system 214 via the network 212, access the workload tag/time-to-live indicator and determine that the workload tag/time-to-live indicator indicates that that workload will operate on an HCI system for less than the workload time period, determine that the workload time period is less than the ephemeral time period discussed above and, in response, identify that the workload is a second ephemeral workload (in comparison to the "first ephemeral workload" identified at block 302 above).

The method 300 then proceeds to block 314 where the manager system determines the first data that is stored on the second HCI system and that is to-be utilized by the second ephemeral workload. Similarly as discussed above for the first ephemeral workload at block 304, in embodiments of block 314, the metadata manager system 210 may operate to determine data that is to-be utilized by the second ephemeral workload received at block 302 of the method 300 (also referred to as "first data" below) and the second first ephemeral workload may include a table or other data structure that identifies the first data that the second ephemeral workload will utilize during its processing. As such, at block 304, the metadata manager system 210 may determine the first data that is to-be utilized by the second ephemeral workload by accessing that table or data structure, but similarly as discussed above, the first data that is to-be utilized by the second ephemeral workload may also be determined by manual specification by an administrator or other user (e.g., based on knowledge that a certain set of application code must be used with a particular data store when that data store already exists, or via a capacity metric when that data store does not exist yet), and/or via other techniques that would be apparent to one of skill in the art in possession of the present disclosure.

Also similarly as discussed above for the first ephemeral workload at block 304, following the determination of the first data that will be utilized by the second ephemeral workload, the metadata manager system 210 may then determine an HCI system in the HCI cluster 202 that stores that first data. For example, with reference to FIG. 4O, the first data 400c was previously replicated on the server device 206 that provides the second HCI system at block 310. As such, at block 314, the metadata manager system 210 may then determine that the first data 400c that is stored in the second HCI system provided by the server device 206 corresponds to the first data that will be utilized by the second ephemeral workload identified at block 312. In some embodiments of block 314, the metadata manager system 210 may identify that the first data 400c is located on both the first HCI system provided by server device 204, and the second HCI system provided by the server device 206, and then may determine that the second HCI system provided by the server device 206 is a preferred location for the second ephemeral workload based on the lower utilization of the second HCI system/server device 206 relative to the first HCI system/server device 204 (as discussed above with reference to FIG. 308).

Figure 4E:
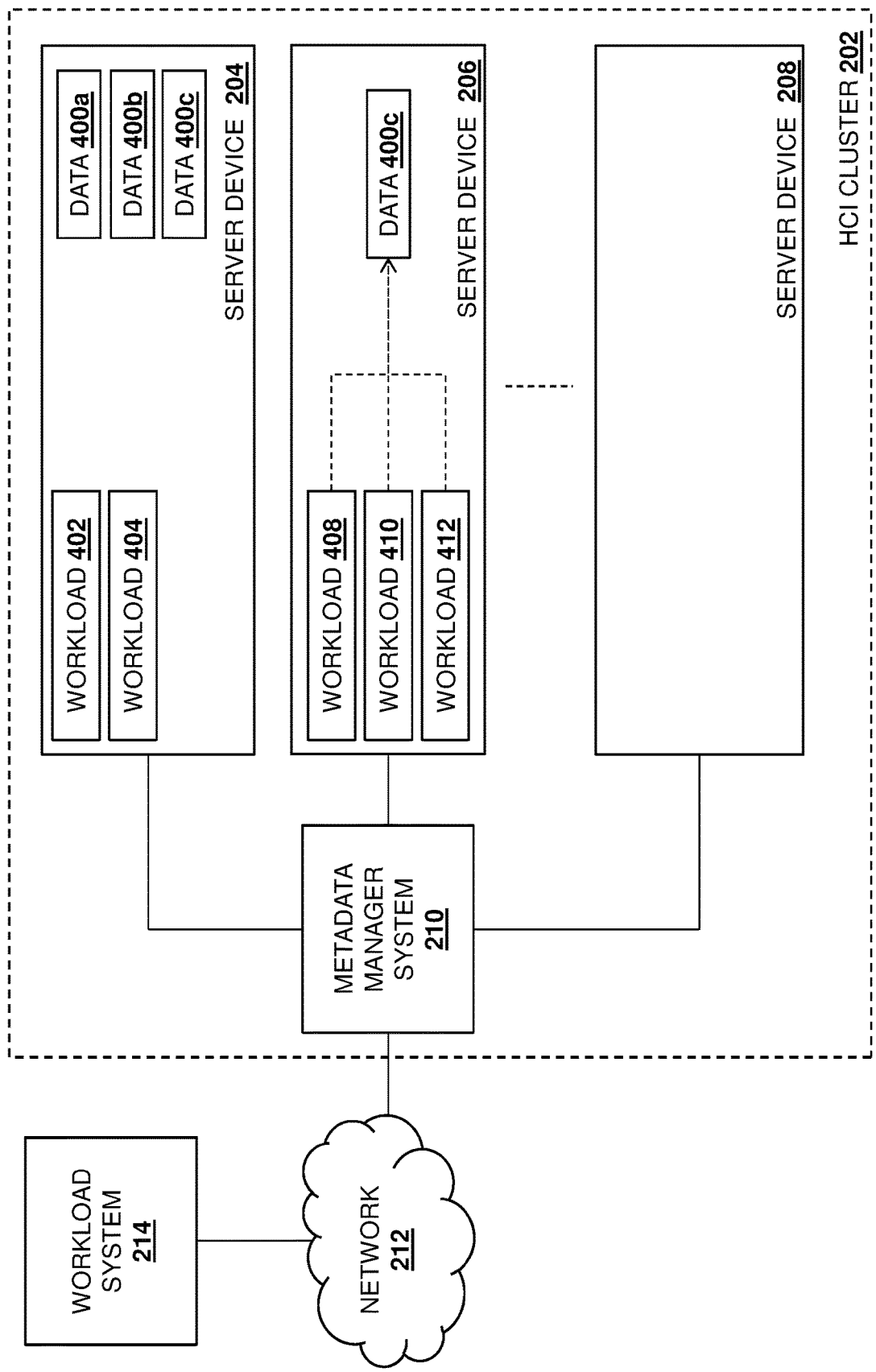
FIG. 4E is a schematic view illustrating an embodiment of ephemeral workloads provisioned in the HCI cluster of FIG. 4D.

The method 300 then proceeds to block 316 where the manager system causes the second ephemeral workload to be provisioned on the second HCI system. With reference to FIG. 4E and similarly as discussed above for the first ephemeral workload at block 306, in embodiments of block 316, the metadata manager system 210 may operate to provision the second ephemeral workload identified at block 312 on the second HCI system provided by the server device 206. For example, with reference to FIG. 4E, at block 316 the metadata manager system 210 may install, substantiate, and/or other provide any application(s), instructions, and/or code that make up the second ephemeral workload (illustrated as the workload 408 in FIG. 4E) on the server device 206 such that the second HCI system provided by the server device 206 is configured to process that second ephemeral workload 408, which one of skill in the art in possession of the present disclosure will recognize includes accessing the first data/data 400c discussed above (as indicated by the dashed arrow in FIG. 4E). Furthermore, as illustrated in FIG. 4E, the metadata manager system 210 may subsequently provision additional ephemeral workloads 410 and 412 that utilize the first data 400c on the second HCI system provided by the server device 206 similarly as discussed above for the second ephemeral workload 408 according to blocks 312-316 of the method 300.

As such, the metadata manager system 210 is configured to preemptively replicate data that is utilized by ephemeral workloads to HCI systems/server devices in the HCI cluster 202 that have relatively low utilization rates, and then subsequently provision any ephemeral workload received from the workload system 214 on those HCI systems/server devices. Similarly as discussed above, following the processing of any of the second ephemeral workload 408 and the ephemeral workloads 410 and 412, the second ephemeral workload 408 and the ephemeral workloads 410 and 412 may be removed from the second HCI system/server device 206 by, for example, deleting, removing, or otherwise causing the application(s), instructions, and/or code that make up the first ephemeral workload to no longer utilize the resources of the second HCI system/server device 206.

Thus, systems and methods have been described that provide for the identification of ephemeral, or relatively short-lived, workloads prior to providing those ephemeral workloads on an HCI system an HCI cluster. The identification of the ephemeral workloads is followed by a determination of the data that those ephemeral workloads will utilize, as well as a determination of an HCI system in the HCI cluster in which that data that is already stored, which allows that ephemeral workload will be provided on that HCI system where that data is stored, eliminating the need to replicate that data on a different HCI system in which the workload would otherwise be provided in a conventional system. As such, the time necessary to replicate data in the HCI cluster is eliminated, thus eliminating a material component of the workload processing time for ephemeral workloads. Furthermore, when data on a first HCI system in the HCI cluster is regularly accessed by ephemeral workloads, the systems and methods of the present disclosure may preemptively replicate that data on a second HCI system in the HCI cluster that may have a lower utilization rate relative to the first HCI system, which allows subsequent ephemeral workloads to be provided on HCI systems with relatively low utilization rates (rather than continually providing those ephemeral workloads on an HCI system that may have a relatively high utilization rate.) The systems and methods increase in the overall performance of HCI clusters while improving workload processing times for workloads performed via HCI systems in those HCI clusters.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Hyper-Converged Infrastructure (HCI) ephemeral workload/data provisioning system, comprising:
 a workload system;
 a plurality of HCI systems; and
 a managing system that is coupled to the workload system and the plurality of HCI systems, wherein the managing system is configured to:
  identify that a first workload that is provided by the workload system is a first ephemeral workload based on a determination that the first workload will operate to completion on one of the plurality of HCI systems in less than a first time period;
  determine, in response to identifying that the first workload is the first ephemeral workload, first data that is to-be utilized by the first ephemeral workload and that is stored on a first HCI system that is included in the plurality of HCI systems;
  determine that a second HCI system that is included in the plurality of HCI systems and that does not store the first data has a lower utilization rate than the first HCI system;
  provision the first ephemeral workload on the first HCI system and not the second HCI system, in response to 1) determining that the first HCI system includes the first data that is to-be utilized by the first ephemeral workload and 2) determining that a processing time associated with the using the first HCI system is shorter than a replication and processing time associated with using the second HCI system;
  replicate the first data on the second HCI system subsequent to provisioning first ephemeral workload on the first HCI system, in response to determining that the second HCI system has a lower utilization rate than the first HCI system;

provision a non-ephemeral workload that is to utilize the first data on the second HCI system, in response to 1) determining that the first HCI system includes the first data that is to-be utilized by the first ephemeral workload, and 2) based at least partly on determining that the second HCI system has a lower utilization rate than the first HCI system; and execute the first ephemeral workload on the first HCI system and the non-ephemeral workload on the second HCI system.

2. The system of claim 1, wherein the managing system is configured to:

determine, prior to identifying the first ephemeral workload, that the first data is located on a third HCI system included in the plurality of HCI systems;

determine, prior to identifying the first ephemeral workload, that the first HCI system has a lower utilization rate than the third HCI system; and replicate, prior to identifying the first ephemeral workload and in response to determining that the first HCI system has a lower utilization rate than the third HCI system, the first data on the first HCI system.

3. The system of claim 2, wherein the first data is associated with a data tag that indicates that the first data is likely to be accessed by an ephemeral workload, and wherein the managing system determines that the first HCI system has the lower utilization rate than the third HCI system in response to identifying the data tag.

4. The system of claim 1 wherein the managing system is configured to: identify that a second workload that is provided by the workload system is a second ephemeral workload based on a determination that the second workload will operate on one of the plurality of HCI systems for less than the first time period;

determine, in response to identifying the second ephemeral workload, that the first data that is to-be utilized by the second ephemeral workload is stored on the first HCI system and was replicated on the second HCI system; and cause, in response to determining that the first HCI system and the second HCI system include the first data that is to-be utilized by the second ephemeral workload and in response to determining that the second HCI system has a lower utilization rate than the first HCI system, the second ephemeral workload to be provisioned on the second HCI system and not the first HCI system.

5. The system of claim 1, wherein the first ephemeral workload is associated with a workload tag that indicates that the first ephemeral workload that is configured to operate on one of the plurality of HCI systems for less than the first time period, and wherein the managing system identifies the first ephemeral workload in response to identifying the workload tag.

6. An Information Handling System (IHS), comprising:
a processing system; and
a memory system that is coupled to the processing system and that includes instructions that, when executed by the processing system, cause the processing system to provide a manager engine that is configured to:
identify that a first workload is a first ephemeral workload based on a determination that the first workload will operate to completion on one of a plurality of Hyper-Converged Infrastructure (HCI) systems in less than a first time period;
determine, in response to identifying that the first workload is the first ephemeral workload, first data that is to-be utilized by the first ephemeral workload and that is stored on a first HCI system that is included in the plurality of HCI systems;
determine that a second HCI system that is included in the plurality of HCI systems and that does not store the first data has a lower utilization rate than the first HCI system;
provision the first ephemeral workload on the first HCI system and not the second HCI system, in response to 1) determining that the first HCI system includes the first data that is to-be utilized by the first ephemeral workload and 2) determining that a processing time associated with the using the first HCI system is shorter than a replication and processing time associated with using the second HCI system;
replicate the first data on the second HCI system subsequent to provisioning first ephemeral workload on the first HCI system, in response to determining that the second HCI system has a lower utilization rate than the first HCI system;
provision a non-ephemeral workload that is to utilize the first data on the second HCI system, in response to 1) determining that the first HCI system includes the first data that is to-be utilized by the first ephemeral workload, and 2) based at least partly on determining that the second HCI system has a lower utilization rate than the first HCI system,
execute the first ephemeral workload on the first HCI system and the non-ephemeral workload on the second HCI system.

7. The IHS of claim 6, wherein the manager engine is configured to:

determine, prior to identifying the first ephemeral workload, that the first data is located on a third HCI system included in the plurality of HCI systems;

determine, prior to identifying the first ephemeral workload, that the first HCI system has a lower utilization rate than the third HCI system; and replicate, prior to identifying the first ephemeral workload and in response to determining that the first HCI system has a lower utilization rate than the third HCI system, the first data on the first HCI system.

8. The IHS of claim 7, wherein the first data is associated with a data tag that indicates that the first data is likely to be accessed by an ephemeral workload, and wherein the manager engine determines that the first HCI system has the lower utilization rate than the third HCI system in response to identifying the data tag.

9. The IHS of claim 7, wherein, prior to the manager engine causing the first ephemeral workload to be provisioned on the first HCI system, the first HCI system does not include any workloads that utilize the first data.

10. The IHS of claim 6, wherein the manager engine is configured to:

identify that a second workload is a second ephemeral workload based on a determination that the second workload will operate on one of the plurality of HCI systems for less than the first time period;

determine, in response to identifying the second ephemeral workload, that the first data that is to-be utilized by the second ephemeral workload is stored on the first HCI system and was replicated on the second HCI system; and cause, in response to determining that the first HCI system and the second HCI system include the first data that is to-be utilized by the second ephemeral workload and in response to determining that the second HCI system has a lower utilization rate than the first HCI system, the second ephemeral workload to be provisioned on the second HCI system and not the first HCI system.

11. The IHS of claim 6, wherein the first ephemeral workload is associated with a workload tag that indicates that the first ephemeral workload that is configured to operate on one of the plurality of HCI systems for less than the first time period, and wherein the manager engine identifies the first ephemeral workload in response to identifying the workload tag.

12. A method for provisioning ephemeral workloads/data in a Hyper-Converged Infrastructure (HCI) cluster, comprising:
   identifying, by a manager system, that a first workload is a first ephemeral workload based on a determination that the first workload will operate to completion on one of a plurality of Hyper-Converged Infrastructure (HCI) systems in less than a first time period;
   determining, by the manager system in response to identifying that the first workload is the first ephemeral workload, first data that is to-be utilized by the first ephemeral workload and that is stored on a first HCI system that is included in the plurality of HCI systems;
   determining, by the manager system, that a second HCI system that is included in the plurality of HCI systems and that does not store the first data has a lower utilization rate than the first HCI system;
   provisioning, by the manager system the first ephemeral workload on the first HCI system and not the second HCI system, in response to 1) determining that the first HCI system includes the first data that is to be utilized by the first ephemeral workload and 2) determining that a processing time associated with the using the first HCI system is shorter than a replication and processing time associated with using the second HCI system;
   replicating, by the manager system, the first data on the second HCI system subsequent to causing the first ephemeral workload to be provisioned on the first HCI system, in response to determining that the second HCI system has a lower utilization rate than the first HCI system; and
   provisioning, by the manager system, a non-ephemeral workload that is to utilize the first data on the second HCI system, in response to 1) determining that the first HCI system includes the first data that is to-be utilized by the first ephemeral workload, and 2) based at least partly on determining that the second HCI system has a lower utilization rate than the first HCI system,
   executing the first ephemeral workload on the first HCI system and the non-ephemeral workload on the second HCI system.

13. The method of claim 12, further comprising:
   determining, by the manager system prior to identifying the first ephemeral workload, that the first data is located on a third HCI system included in the plurality of HCI systems;
   determining, by the manager system prior to identifying the first ephemeral workload, that the first HCI system has a lower utilization rate than the third HCI system; and
   replicating, by the manager system prior to identifying the first ephemeral workload and in response to determining that the first HCI system has a lower utilization rate than the third HCI system, the first data on the first HCI system.

14. The method of claim 13, wherein the first data is associated with a data tag that indicates that the first data is likely to be accessed by an ephemeral workload, and wherein the manager system determines that the first HCI system has the lower utilization rate than the third HCI system in response to identifying the data tag.

15. The method of claim 13, wherein, prior to the manager system causing the first ephemeral workload to be provisioned on the first HCI system, the first HCI system does not include any workloads that utilize the first data.

16. The method of claim 12, further comprising:
   identifying, by the manager system, that a second workload is a second ephemeral workload based on a determination that the second workload will operate on one of the plurality of HCI systems for less than the first time period;
   determining, by the manager system in response to identifying the second ephemeral workload, that the first data that is to-be utilized by the second ephemeral workload is stored on the first HCI system and was replicated on the second HCI system; and
   causing, by the manager system, in response to determining that the second HCI system includes the first data that is to be utilized by the second ephemeral workload and in response to determining that the second HCI system has a lower utilization rate than the first HCI system, the second ephemeral workload to be provisioned on the second HCI system and not the first HCI system.

17. The method of claim 12, wherein the first ephemeral workload is associated with a workload tag that indicates that the first ephemeral workload that is configured to operate on one of the plurality of HCI systems for less than the first time period, and wherein the manager system identifies the first ephemeral workload in response to identifying the workload tag.

* * * * *